3,781,312
PROCESS FOR PREPARING 3-HYDROXY-9α-HYDROGEN-11α-HYDROXY-RING A-AROMATIC STEROIDS

Gordon Hanley Phillipps, Wembley, and John Peter Turnbull, London, England, assignors to Glaxo Laboratories Limited, Greenford, England
No Drawing. Filed Oct. 27, 1971, Ser. No. 193,177
Int. Cl. C07c *169/08*
U.S. Cl. 260—397.45                                  13 Claims

ABSTRACT OF THE DISCLOSURE 3-hydroxy-9α-hydrogen - 11α-hydroxy-ring A-aromatic steroids are prepared by reducing a 3-hydroxy- or -acyloxy-9α-hydroxy-11β-nitro-oxy-ring A-aromatic steroid with a borohydride reducing agent such as sodium or potassium borohydride.

---

This invention relates to a novel method of producing 11α-hydroxy steroids.

The presence of a substituent at the 11-position, in particular an oxygen function, is an important factor determinating the physiological activity of many steroids. Our co-pending application No. 91,548 describes the introduction of an 11β-hydroxy or 11-keto group into steroids possessing an aromatic A-ring by reduction of a 9α-hydroxy-11β-nitro-oxy steroid 1,3,5(10)-triene, e.g., by hydrogenation, and if desired subsequent oxidation, to give the corresponding 9α-hydroxy-11β-hydroxy- or 11-keto steroid.

It has now been found that reduction of 3-hydroxy- or acyloxy-9α-hydroxy-11β-nitrates with a borohydride reducing agent can give the corresponding 3-hydroxy-9α-hydrogen-11α-hydroxy steroids which are, for example, of particular interest as intermediates in the preparation of the corresponding 11β-halogeno steroids by the methods of our British patent specifications Nos. 1,159,434 and 1,202,521.

According to the present invention there is provided a process for the preparation of 3-hydroxy-9α-hydrogen-11α-hydroxy-ring A-aromatic steroids in which a 3-hydroxy or acyloxy-9α-hydroxy-11β-nitro-oxy-ring A-aromatic steroid is reduced with a borohydride reducing agent whereby the corresponding 9α-hydrogen-11α-hydroxy-ring A aromatic steroid is formed.

The reaction is desirably effected using an alkali metal borohydride or alkaline earth metal borohydride, more particularly sodium or potassium borohydride, advantageously in considerable excess over the stoichiometric quantity, e.g. from 5 to 15 moles per mole of starting material. Any other reactive groups present in the starting material, e.g. keto groups, can either be protected or allowed to be reduced or hydrolyzed. For example, a 17-keto group will be reduced to a 17-hydroxy group unless protected, e.g. as a ketal; while a 3-acyloxy group will be hydrolyzed to yield the corresponding 3-hydroxy group. If desired, hydroxy groups formed during the reaction according to the invention may be subsequently converted into other groups e.g. oxidation of the 17-hydroxy group to the 17-keto group or etherification of the 3-hydroxy group.

Naturally where reduction of other groups is involved, extra borohydride reducing agent is advantageously used.

The temperature of the reaction is suitably from 0° to the boiling of the reaction medium. Elevated temperatures, i.e. those above ambient, are preferred while lower temperatures, e.g. ambient temperatures and below, may also be used but with longer reaction times.

The solvent used is preferably a polar solvent, conveniently a lower alcohol, e.g. ethanol or methanol, if desired with the addition of water, e.g. up to about 25%, provided this is compatible with the solubility of the starting material and reagent. Other polar solvents inert to borohydride reduction, e.g. cyclic ethers such as tetrahydrofuran and dioxan, or hydroxy ethers such as ethylene glycol monomethyl ether or di(hydroxyethyl) ether, may also be employed.

The steroid starting material preferably carries an acyloxy group in the 3-position of the aromatic A-ring. The acyloxy group may, for example, be derived from a carboxylic acid, a hydrocarbon sulphonic acid, sulphuric acid, nitric acid or phosphoric acid; for example an aromatic carboxylic acid such as benzoic or toluic acid, an araliphatic carboxylic acid such as phenylacetic or phenylpropionic acid, an aliphatic carboxylic acid such as acetic, propionic or trifluoroacetic acid, an aliphatic sulphonic acid such as methanesulphonic acid or an aromatic sulphonic acid such as p-toluenesulphonic acid.

The C-ring of the steroid carries no further substituents. The B-ring is preferably saturated and it is also preferred that there is no substituent at the 6-position. The 1- or 4-positions may, however, carry substituents such as alkyl groups, e.g. methyl groups, and the 16-position may carry a halogen atom, an alkyl group, e.g. a methyl group, or a methylene group. The 13-position may carry an alkyl group, for example a methy or ethyl group. The 17-position may carry, for example, a keto group or a hydrogen atom or a hydroxy or acyloxy group which may be present together with a hydrogen atom or a saturated or unsaturated hydrocarbon group such as an alkyl group which may carry substituents such as keto, protected keto, hydroxy or acyloxy group. Where alkyl and/or acyloxy groups are present these preferably contain 1–6 carbon atoms.

The starting materials may be prepared as described in our said copending application by the reaction of a 3-acyloxy-9,11-unsubstituted ring A-aromatic steroid with ceric ions in the presence of nitrate ions, e.g. with ceric ammonium nitrate, preferably in a water miscible organic solvent such as acetic acid.

When the corresponding 9β - hydroxy-11β-nitro-oxy steroid is used as starting material, a mixture of products is obtained from which the 9α-hydrogen isomer can be isolated, for example by chromatography. According to a further feature of the present invention therefore there is provided a modification of the process described above in which a 9β-hydroxy-11β-nitro-oxy starting material is used and 9α-hydrogen-11β-hydroxy steroid obtained is isolated by chromatography.

The following examples illustrate the invention; melting points were determined in open capillaries and are corrected. Thin layer chromatography was carried out on plates coated with Merck Kieselgel $PF_{254}$ and $PF_{366}$ developed with chloroform-isopropanol mixtures. All temperatures are given in ° C.

EXAMPLE 1

Oestra-1,3,5(10)-triene-3,11α,17β-triol

3 - acetoxy-9α,11β-dihydroxy-oestra-1,3,5(10)-trien-17-one 11β-nitrate (390 mg., 1 mmole) was refluxed with sodium borohydride (530 mg., 13 mmole) in ethanol (8 ml.) and water (2 ml.) for 1 hr. The cooled solution was cautiously acidified with acetic acid then diluted with water to 50 ml. After 1 hr., the crystalline precipitate of the title compound was filtered off (195 mg., 68%) M.P. 251–254°. Extraction of the mother liquor with chloroform and crystallization from ethyl acetate gave further title compound (25 mg., 9%). Recrystallization of the combined crops from ethyl acetate-methanol gave needles (105 mg.; 37%), M.P. 260–261°, $[\alpha]_D$ −53° (c., 1.08 in dioxan).

EXAMPLE 2

3-methoxy-oestra-1,3,5(10)-triene-11α,17β-diol

To a stirred mixture of oestra-1,3,5(10)-triene-3, 11α, 17β-triol (1.6 g.; 5.55 mmole) and powdered anhydrous potassium carbonate (5.4 g.; 40 mmole) in acetone (40 ml.) at room temperature was added dimethyl sulphate (4 ml.) over 5 min. The mixture was refluxed for 4 hr. cooled and poured into water (150 ml.). The product was extracted into ethyl acetate (2× 75 ml.) and the combined extracts were evaporated to dryness in vacuo. Crystallization of the residue from ethyl acetate-cyclohexane gave the title compound as fine needles (1.57 g.; 94%), M.P. 144–145°.

EXAMPLE 3

11α-hydroxy-3-methoxy-oestra-1,3,5(10)-trien-17-one

A solution of 3 - methoxy-oestra - 1,3,5(10)-triene-11α,17β-diol (302 mg.; 1 mmole) and cyclohexanone (2 ml.; ca. 20 mmole) in benzene (20 ml.) was azeotroped dry, then aluminum isopropoxide (408 mg.; 2 mmole) was added. The mixture was refluxed for 45 min., cooled and was washed with 2 N-hydrochloric acid (25 ml.), then water, and the benzene and unreacted cyclohexanone were removed by distillation at 0.1 mm. Hg. Crystallization of the residue from cyclohexane-methylene chloride gave the title compound in two crops: (1) needles (135 mg.; 45%), M.P. 152–153° and (2) prisms (61 mg.; 20%), M.P. 128–130°. The materials did not differ on t.l.c.

EXAMPLE 4

17α-acetoxy-3,11α-dihydroxy-19-norpregna-1,3,5(10)-trien-20-one 3,17α - diacetoxy-9α,11β-dihydroxy-19-norpregna-1,3,5 (10)-trien-20-one 11β-nitrate (500 mg.; 1.05 mmole) and powdered sodium borohydride (520 mg.; 13 mmole) were stirred at room temperature in ethanol (50 ml.) for 3 hr. The solution was then poured into water, cautiously acidified with 2 N-sulphuric acid and the product extracted into ethyl acetate (3× 50 ml.). The extracts were washed with water (50 ml.) then 10% potassium hydrogen carbonate (25 ml.), and the solvent evaporated in vacuo. Thin-layer chromatography followed by crystallization from cyclohexanemethylene chloride and recrystallization from aqueous acetone gave the title compound as hydrated needles in two crops (total 104 mg.; 25%) M.P. 175–177° (shrinks at 140°).

EXAMPLE 5

20β-acetoxy-19-norpregna-1,3,5(10)-triene-3,11α-diol 3,20β-diacetoxy - 19 - norpregna - 1,3,5(10)-triene-9α,11β-diol 11β-nitrate (230 mg.; 0.5 mmole) was refluxed with sodium borohydride (230 mg.; ca. 6 mmole) in 80% ethanol (12 ml.) for 1 hr. The cooled solution was then cautiously acidified with 2 N-sulphuric acid (12 ml.) and the product left to crystallize. After 17 hr. it was filtered off, washed with water, and dried (154 mg.; 86%). Two recrystallizations from cyclohexane-ethyl acetate gave the title compound as needles (69 mg.; 39%) double M.P. 227–228° and 236–239°.

EXAMPLE 6

20β-acetoxy-19-norpregna-1,3,5(10)-triene-3,11β-diol 3,20β - diacetoxy - 19 - nor-9β-pregna-1,3,5(10)-triene-9β,11β-diol 11β-nitrate (400 mg.; 0.85 mmole) was refluxed with sodium borohydride (400 mg.; 10 mmole) in ethanol (25 ml.) for 2 hr. The cooled solution was cautiously acidified with 2 N-sulphuric acid (50 ml.) and the product extracted into ether (2× 50 ml.). The extracts were washed with water (2× 50 ml.) and the solvent was removed in vacuo. Thin-layer chromatography of the residue afforded the crude title compound (82 mg.; 27%) which was recrystallized from cyclohexane-chloroform to give prisms (71 mg.; 24%), M.P. 238–240°.

EXAMPLE 7

Oestra-1,3,5,(10)-triene-3,11α,17β-triol (a) From 3-acetoxy-9α,11β-dihydroxy-oestra-1,3,5(10)-trien-17-one 11β-nitrate with potassium borohydride: The acetate (50 mg.) and potassium borohydride (150 mg.) and were boiled under reflux for one hour in ethanol (4 ml.) and water (1 ml.). The reaction mixture was poured into water, acidified with 2 N-hydrochloric acid and extracted with ethyl acetate. Removal of solvent from the extract left the crude title compound (45 mg.). M.P. 225–230°, which was crystallized from ethyl acetate-petroleum ether (B.P. 40–60°) to give a purer sample (18 mg.), M.P. 247–250°.

(b) From 9α,11β - dihydroxy - 3 - propionyloxyoestra-1,3,5(10)-trien-17-one 11β-nitrate with sodium borohydride: The propionate (10 mg.) and sodium borohydride (50 mg.) were boiled under reflux for one hour in ethanol (2 ml.) and water (0.5 ml.). Isolation as in (a) gave the crude title compound (3 mg.) which showed an $R_f$ value of 0.35 on thin layer chromatography on silica in 1:1 acetone-petroleum ether (B.P. 40–60°), identical with that of the standard. Gas chromatography at 230° on a column coated with 2% QFI (a silicone polymer containing 50% of trifluoropropyl groups, the remainder being methyl groups, distributed by the Applied Science Laboratories, P.O. Box 440, State College, Pa. 16801, United States of America) showed a main peak with a retention time of 2.3 min., identical with that of the standard. The crude product crystallized from ethyl acetate to give a sample M.P. 249–252°.

(c) From 9α,11β - dihydroxy - 3 - toluene-p-sulphonyloxyoestra - 1,3,5(10) - trien - 17 - one 11β-nitrate with sodium borohydride: The tosylate (10 mg.) was treated as described in (b) but for 2 hr. to give the crude title compound (ca. 5 mg.), as judged from its behavior on thin layer chromatography and gas chromatography. It crystallized from ethyl acetate with M.P. 247–250°.

(d) From 9α,11β - dihydroxy - 3 - methanesulphonyloxyoestra - 1,3,5(10) - trien - 17 - one-11β-nitrate with sodium borohydride: The methanesulphonate (10 mg.) was treated as for the toluene-p-sulphonate in (c) to give the crude title compound (ca. 6 mg.), as judged from its behavior on thin layer chromatography and gas chromatography. It crystallized from ethyl acetate with M.P. 245–249°.

We claim:

1. A process for the preparation of a 3-hydroxy-9α-hydrogen-11α-hydroxy ring A-aromatic steroid of the oestrane, gonane, or 19-norpregnane series which comprises reducing with borohydride reducing agent a corresponding 3-hydroxy or acyloxy-9α-hydroxy-11β-nitro-oxy-ring A-aromatic steroid of said series.

2. A process as claimed in claim 1 in which the reducing agent is an alkali metal borohydride.

3. A process as claimed in claim 1 which the reducing agent is used in excess.

4. A process as claimed in claim 3 in which 5 to 15 moles of the reducing agent is used per mole of starting material.

5. The process of claim 1 wherein the reduction is effected in a polar solvent selected from the group consisting of a lower alcohol, a cyclic ether, and a hydroxy ether.

6. A process as claimed in claim 1 in which the steroid starting material carries a 3-acyloxy group derived from a carboxylic acid or hydrocarbon sulphonic acid.

7. A process as claimed in claim 6 in which the carboxylic acid is an aromatic, araliphatic or aliphatic carboxylic acid or an aliphatic or aromatic sulphonic acid.

8. The process of claim 5 where the polar solvent contains water.

9. The process of claim 1 wherein the 3-hydroxy or acyloxy - 9α - hydroxy - 11β - nitro-oxy-ring A-aromatic steroid starting material of said series possesses at least one of the following characteristics:
a saturated B ring; an unsubstituted 6-position; a 1- or 4-alkyl group; a 16-halogen atom, alkyl group or methylene group; a 13-alkyl group; a 17-keto group; or a 17-hydrogen atom or 17-hydroxy or -acyloxy group together with a 17-hydrogen atom, 17-saturated or unsaturated hydrocarbon group, or 17-substituted saturated or unsaturated hydrocarbon group.

10. A process as claimed in claim 9 in which the alkyl group present at the 1-, 4- or 16-position is a methyl group and the alkyl group present at the 13-position is a methyl or ethyl group.

11. A process as claimed in claim 9 in which the 17-hydrocarbon group is an alkyl group with 1–6 carbon atoms.

12. A process as claimed in claim 11 in which the 17-hydrocarbon group carries a keto, protected keto, hydroxy or acyloxy group.

13. A modification of the process as claimed in claim 1 in which a 9β-hydroxy-11β-nitro-oxy starting material is used and the 9α-hydrogen-11β-hydroxy steroid obtained is isolated by chromatography.

References Cited
UNITED STATES PATENTS

| 3,519,714 | 7/1970 | Hughes et al. | 260—397.4 |
| 3,520,909 | 7/1970 | Consonni et al. | 260—397.45 |
| 3,639,434 | 2/1972 | Oxley et al. | 260—397.45 |

ELBERT L. ROBERTS, Primary Examiner

U.S. Cl. X.R.

260—397.5